(12) United States Patent
Sinnock

(10) Patent No.: US 6,925,361 B1
(45) Date of Patent: Aug. 2, 2005

(54) DISTRIBUTED ENERGY NEURAL NETWORK INTEGRATION SYSTEM

(75) Inventor: Herbert James Sinnock, Somerville, MA (US)

(73) Assignee: Orion Engineering Corp., Westford, MA (US)

( * ) Notice: Subject to any disclaimer, the term of this patent is extended or adjusted under 35 U.S.C. 154(b) by 724 days.

(21) Appl. No.: 09/699,296

(22) Filed: Oct. 28, 2000

Related U.S. Application Data

(60) Provisional application No. 60/168,003, filed on Nov. 30, 1999.

(51) Int. Cl.[7] .............................................. G06F 19/00
(52) U.S. Cl. ...................................................... 700/286
(58) Field of Search .............................. 700/22, 28–37, 700/286–290, 297, 298

(56) References Cited

U.S. PATENT DOCUMENTS

| | | | | |
|---|---|---|---|---|
| 5,412,754 A | * | 5/1995 | Le Cun et al. ................ | 706/31 |
| 5,767,584 A | * | 6/1998 | Gore et al. ................... | 290/1 R |
| 6,107,691 A | * | 8/2000 | Gore et al. ................... | 290/1 R |
| 6,134,124 A | * | 10/2000 | Jungreis et al. ............... | 363/34 |
| 6,297,980 B1 | * | 10/2001 | Smedley et al. .............. | 363/89 |
| 6,329,725 B1 | * | 12/2001 | Woodall et al. ............... | 307/19 |
| 6,380,637 B1 | * | 4/2002 | Hsu et al. .................... | 290/1 R |
| 6,649,289 B2 | * | 11/2003 | Hsu et al. ..................... | 429/13 |
| 6,708,160 B1 | * | 3/2004 | Werbos ........................ | 706/30 |

* cited by examiner

Primary Examiner—Maria N. Von Buhr
(74) Attorney, Agent, or Firm—Mark Kurisko

(57) ABSTRACT

A system that couples distributed power generators together as a collective unit for the purposes of selling or purchasing energy from the electrical power grid. The apparatus includes a charge/discharge controller and an adaptive controller. The charge/discharge controller transfers energy generated by the plurality of distributed power generators to the power grid. The adaptive controller directs when the charge/discharge controller transfers energy generated by at least one of the plurality of distributed power generators to the electrical grid.

43 Claims, 3 Drawing Sheets

DISTRIBUTED ENERGY NEURAL NETWORK INTEGRATION SYSTEM

DISTRIBUTED ENERGY NEURAL NETWORK INTEGRATION SYSTEM

REFERENCE TO RELATED APPLICATIONS

This application claims the benefit of U.S. Provisional Application No. 60/168,003, filed Nov. 30, 1999, the contents of which are incorporated herein by reference.

BACKGROUND OF THE INVENTION

Deregulation is rapidly transforming the monopoly structure of the U.S. electric power market. The mid to late 1990s saw renewables ushered into the power market for the first time in substantial quantity. Until 1995, utilities were structured around massive, central generating plants. Power was distributed to individual consumers through an elaborate network of power lines. Attempts to implement renewable energy generation were largely unsuccessful. The monopoly-induced constraint that generation occur in a single location created large, unwieldy systems that were not cost effective.

In response to oil supply crunches throughout the 1970s, Congress passed the Public Utility Regulatory Policies Act (PURPA). PURPA was intended to open the power market to alternative energy sources and reduce the nation's dependence on foreign oil. An important provision to PURPA requiring utilities to buy power from Non-Utility Generators (NUG) was hugely unpopular with utilities because it disrupted their own efforts to economically schedule generation. Also, the activity of NUGs at scattered locations on the grid tended to disrupt power flow. As a result, utilities made every effort to discourage NUGs and fight PURPA in the courts.

The Energy Policy Act (EPAct) was passed by Congress in 1992. Since PURPA was largely a failure. EPAct established new mechanisms to open the wholesale electricity market to outside generators. Specifically, EPAct created two new classes of power generators called Energy Wholesalers and Small-Power Producers (SPPs). Energy Wholesalers and SPPs were often independent companies cogenerating steam and electricity and selling them to industrial customers. For the first time, companies were able to contract for power with independent generating companies, often at substantially lower prices.

Industrial consumers, aware that some companies were getting excellent electricity prices by contracting power, began to demand that the government deregulate the wholesale electricity market. Such deregulation, they argued, would allow them to contract for power with generation companies in other states.

The fundamental precept of deregulation is the unbundling of generation, transmission and distribution systems. Generation consists of all possible methods of creating electric power. Transmission facilities transfer the generated power at high voltage to substations. Distribution systems deliver power from the substations to individual customers. The most common technique of implementing deregulation is to force utility companies to lease their transmission lines to an Independent System Operator (ISO). The ISO has the responsibility of matching electric demand with electric supply and setting the system-wide wholesale electricity price. The ISO buys power from the lowest bidders in the pool of available generation. Any generator who wishes to sell power registers a bid with the ISO. Public utility companies are still required to run the distribution system. Utilities may continue to run their generation facilities if they register as holding companies with the Securities and Exchanges Commission (SEC). Utilities that do not register will have to create separate generating companies or sell their generation to other companies.

The important change brought on by PURPA, EPAct, and deregulation is that anybody who generates a significant quantity of power can sell it to the grid. However, distributed power generators who do not individually generate a significant quantity of power have difficulty selling power to the power grid.

Accordingly, there exists a need for a system that allows distributed power generators to sell power to the power grid.

SUMMARY OF THE INVENTION

The invention overcomes the above noted obstacles by providing for a system that allows distributed power generators to collectively sell energy to the power grid. The invention, in accordance with one aspect, provides for an apparatus that operably couples a plurality of distributed power generators to the electrical power grid. The apparatus includes a charge/discharge controller and an adaptive controller. The charge/discharge controller transfers energy generated by the plurality of distributed power generators to the power grid. The adaptive controller directs when the charge/discharge controller transfers energy generated by at least one of the plurality of distributed power generators to the electrical grid. In addition, the adaptive controller directs the charge/discharge controller based upon at least one selected parameter.

In accordance with a further aspect, the invention can include an apparatus for operably coupling a single distributed power generator to the electrical power grid. The d apparatus includes a charge/discharge controller and an adaptive controller. The charge/discharge controller transfers energy generated by the distributed power generator to the power grid. The adaptive controller directs, based upon at least one selected parameter, when the charge/discharge controller transfers energy generated by the distributed power generator to the electrical grid

BRIEF DESCRIPTION OF THE DRAWINGS

The features and advantages of the invention will be apparent from the following description, as illustrated in the accompanying Figures in which like reference characters refer to the same elements throughout the different Figures.

DETAILED DESCRIPTION OF THE INVENTION

Figure 1:
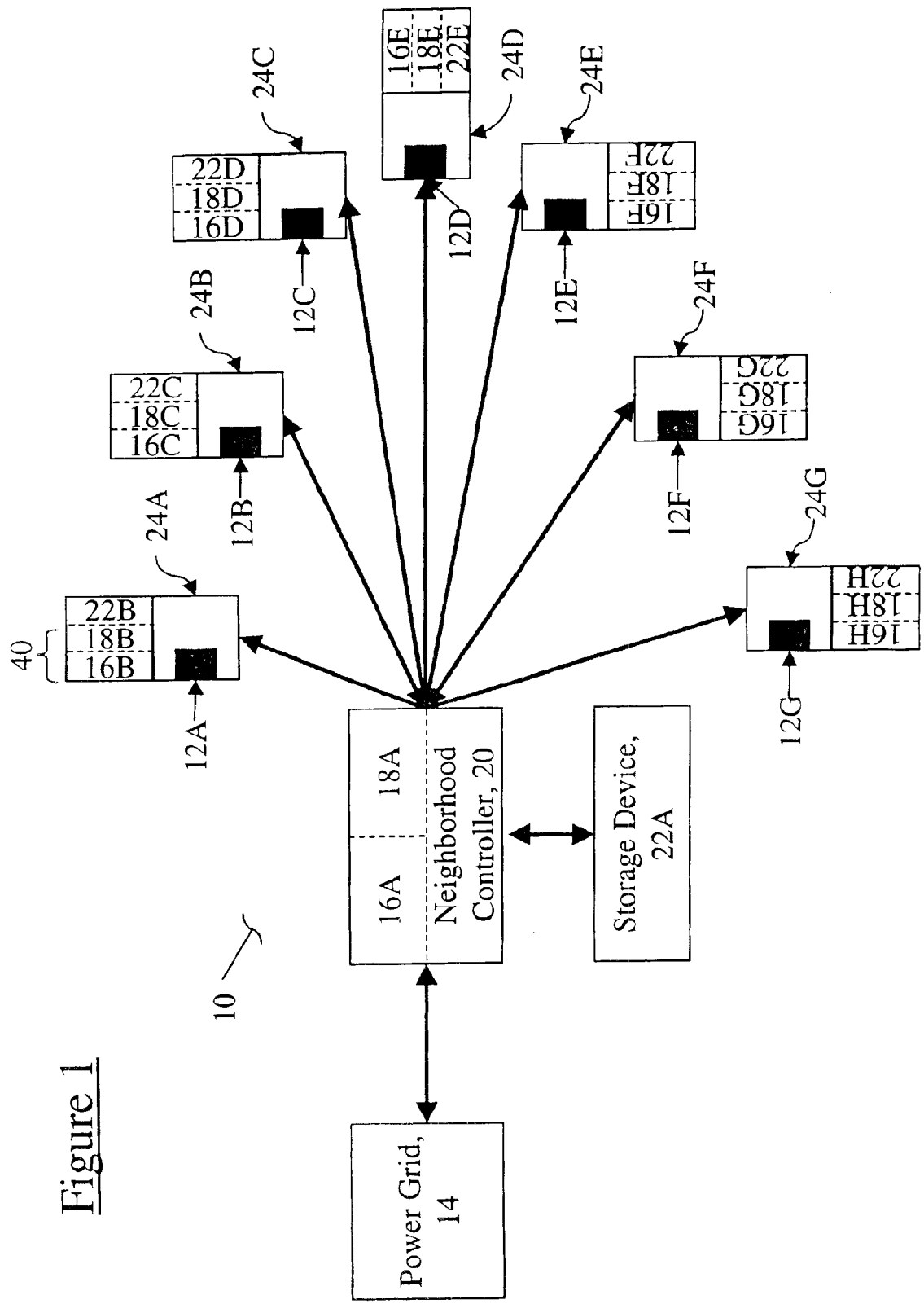
FIG. 1 is a block diagram of an apparatus for coupling a plurality of distributed power generators to an electrical power grid in accordance with the invention.

FIG. 1 shows a block diagram of an apparatus 10 for operably coupling a plurality of distributed power generators 12A, 12B, 12C, •12D, 12E, 12F and 12G to an electrical power grid 14. The apparatus 10 includes a charge/discharge controller 16 (illustrated at various exemplary locations designed as 16A–16H, and identified generically as item 16) and an adaptive controller 18 (illustrated at various exemplary locations designated as 18A–18H, and identified generically as item 18). The charge/discharge controller 16 transfers energy generated by the plurality of distributed power generators (selected from 12A–12G) to the power grid 14. The adaptive controller 18 directs when the charge/discharge controller 16 transfers energy generated by at least one of the plurality of distributed power generators 12A–12G to the power grid 14. The adaptive controller 18 directs the controller 16 based upon at least one selected parameter 35 from the measured parameters of FIG. 2. In operation, the apparatus 10 of FIG. 1 allows the distributed power generators 12A–12G to collectively sell or purchase from the power grid 14.

The current trend in power systems is distributed energy generation using distributed power generators 12A–12G. With open competition in the generation market, it is no longer economically feasible to build costly central power plants that take years to bring on line. It is easiest to use one of the inexpensive, small, distributed power generators being marketed by Enron, GE, and others. These distributed power generators can be placed near the point of use thereby minimizing power loss and line-use charges. FIG. 1 illustrates each of the distributed power generators 12A–12G being placed proximal to energy users 24A–24G, respectively. The energy users 24A–24G can represent, for example, a household.

The leading technologies for distributed power generators 12A–12G include gas turbines, fuel cells, wind turbines, photovoltaics, and micro-hydropower. Current gas turbine systems can be sized to provide power at levels between that required for a single house to that required for a small city. Companies like GE and Honeywell International are increasingly targeting gas turbine and fuel cell products for the residential market. Photovoltaics and wind turbines have always been ideal for distributed power applications, but until now they have suffered in the residential market because they are weather dependent. The key to successful marketing of photovoltaics and other renewables in the distributed power market will be to develop systems that are easy to install, cost-effective, and offer reliable backup power when generation is not available.

The charge/discharge controller 16 contains the power circuitry necessary to transfer power from generation sources (e.g. the grid 14 or the distributed generators 12A–12G), to the energy storage devices 22A–22H or to the and energy users 24A–24G. The charge/discharge controller 16 can also contain the power circuitry necessary to transfer power from the energy storage devices to the grid or to the energy users. Additionally, the charge/discharge controller 16 can contain the power circuitry necessary to transfer power from the distributed generators to the grid 14. The charge/discharge controller is governed by the control algorithm output by the adaptive controller 18.

The charge/discharge controller 16 can include DC-DC converters, rectifiers and charge controllers to convert voltages between the generation sources 14, 12A–12G and the storage devices 22A–22H. The charge/discharge controller can also include an inverter to transfer energy from the storage devices 22A–22H to the grid 14, and a rectifier and a charge controller to transfer energy from the grid 14 to the storage devices 22A–22H. Alternatively, or in addition, the charge/discharge controller can contain inverters, rectifiers and DC-DC converters to directly couple the output of the generators 12A–12G or grid 14 to AC or DC appliances.

The adaptive controller 18 can direct the charge/discharge controller 16 to take various actions. In particular, adaptive controller 18 can direct the charge/discharge controller 16 to transfer energy through at least one of seven or more different paths based upon at least one selected parameter 35. The paths through which the energy can be transferred includes: (1) from the grid to an energy storage device; (2) from the grid to an energy user; (3) from a distributed power generator to an energy storage device; (4) from a distributed power generator power generator to an energy user; (5) from an energy storage device to the grid; (6) from an energy storage device to an energy user; and (7) from an distributed power generator to the grid. The adaptive controller 18 can include a neural network, as described in further detail with respect to FIGS. 2 and 3.

As noted above, the apparatus 10 can also include the energy storage device 22, such as a battery or other type of energy storage device known to those of skill in the art. The energy storage device, generically identified as item 22, can be placed at various exemplary locations (identified as items 22A–22H) throughout the apparatus 10. For instance, the energy storage device 22A can be operably coupled with the neighborhood controller 20. Alternatively, or in addition, an energy storage device 22B can be located proximal to the energy user 24A.

In operation, the energy storage device 22 allows for both storage and retrieval of energy. The charge/discharge controller 16 can transfer energy generated by at least one of the distributed power generators 12A–12G to the energy storage device 22, or alternatively the charge/discharge controller 16 can transfer energy between the energy storage device 22 and the power grid 14.

As shown in FIG. 1, the apparatus 10 can include a neighborhood controller 20 having the charge/discharge controller 16A housed therein. In this aspect of the invention, the neighborhood controller 20 interfaces with the power grid 14. The neighborhood controller 20 can provide for a single tie-in point between the distributed power generators 12A–12G and the power grid 14, thereby allowing the controller 20 to provide the combined energy generating capacity of the plurality of distributed power generators 12A–12G to the power grid 14.

In another aspect of the invention, the neighborhood controller 20 can include a neighborhood distributed power generator (not shown). The neighborhood distributed power generator provides the ability to boost the neighborhood energy generation in response to the needs of the neighborhood controller 20.

The neighborhood controller 20 allows the plurality of distributed power generators 12A–12G to act as a small power generating company. For example, if the neighborhood controller 20 is the nexus of an aggregated generation capacity of about 100kW for 100 homes with an additional storage 900kWh or more, it can register bids with the ISO. This technology turns the plurality of distributed power generators 12A–12G into a single large generator capable of selling locally generated power in a coordinated matter similar to commercial power plants.

Figure 2:
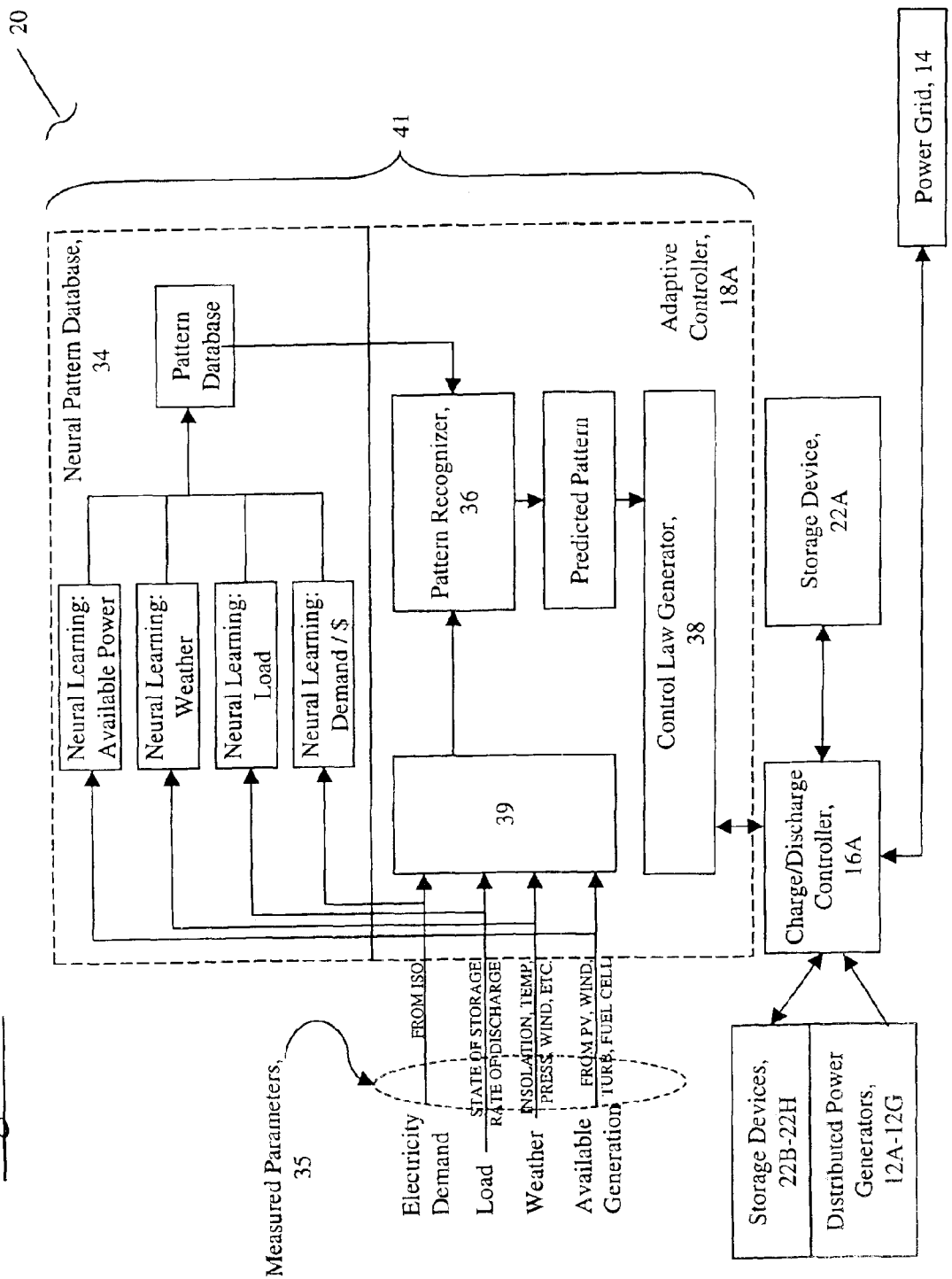
FIG. 2 is an exemplary block diagram of the neighborhood controller of FIG. 1.

The neighborhood controller 20 can provide all the distributed power generators 12A–12H the ability to jointly sell their excess power to the grid. If the neighborhood controller 20 determines that there is a selling opportunity, it signals the adaptive controllers 16B–16H to direct the charge/discharge controller 18B–18H to direct their energy through the charge/discharge controller 18A to the power grid 14. The neighborhood controller 20 thus enables bulk electricity transactions on the wholesale market and provides additional power reliability to the entire system FIG. 2 shows a detailed block diagram of an exemplary neighborhood controller 20. The exemplary neighborhood controller 20 includes the adaptive controller 18A and the charge/discharge controller 16A. The adaptive controller 18A directs the charge/discharge controller 16A. The charge/discharge controller 16A transfers energy between the power grid 14, the distributed power generators 12A–12G, and the storage devices 22A–22H.

The adaptive controller 18A can include a pattern database 34, a pattern recognizer 36, a control law generator 38, and a measured parameter detector 39. The pattern database 34 stores and retrieves profiles for established weather, load, demand and available power. That is, each profile is formed of at least one selected parameter. The profiles in the pattern database can be based upon one or more past measured parameters from the parameter detector 39. The pattern recognizer 36 correlates the measured parameters 35 from element 39 with a selected profile from the pattern database 34, and the control law generator 38 then directs the charge/discharge controller 16A based upon the correlation between the current measured parameters and the selected profile. The pattern database 34, the pattern recognizer 36 and the control law generator 38 together form a neural network 41.

The measured parameter detector 39 can measure the market price for electricity or the demand for electricity on the power grid. The parameter detector 39, in accordance with one feature of the invention, can obtain a signal identifying the market price for electricity from an externally supplied signal, such as a signal from an ISO. Preferably, the parameter detector 39 also measures other parameters 35, such as the actual load demand from one or more of the energy users 24A–24G; the state of energy storage and rate of discharge from the energy storage devices 22A–22H; current weather (insolation, wind speed and direction, temperature and barometric pressure); and available power from distributed power generators 12A–12G. The parameter detector 39 forwards these measurements to the neural network 41, preferably to the pattern recognizer 36.

Other aspects of the invention provide for a neural network 41 that serves as an evolving pattern database that can correlate the current measured parameters received from element 39 to established weather, load, demand and available power profiles obtained from the pattern database 34. The selected profile can be used to predict trends in all parameters, and therefore, becomes the basis for generating a control law.

In one aspect of the invention, the neural pattern database 41 can be implemented using Adaptive Resonance Theory (hereinafter "ART") developed by Grossberg, S. et al., Introduction and Foundations, Lecture Notes, Neural Network Courses and Conference, Boston University, May 1999; and by Carpenter, G., Ross, W., "ART-EMAP" A Neural Network Architecture for Object Recognition by Evidence Automation, "IEEE Transactions on Neural Networks, Jul. 1995; the contents of both references are incorporated herein by reference. ART uses feedback between its two layers to create resonance. Resonance occurs when the output in the first layer after feedback from the second layer matches the original pattern used as input for the first layer in that processing cycle. A match of this type does not have to be perfect, instead it must exceed a predetermined level, termed the vigilance parameter.

An input vector, when applied to an ART system, is first compared to existing patterns in the system. If there is a close enough match within a specified tolerance, then that stored pattern is made to resemble the input pattern further and the classification operation is complete. If the input pattern does not resemble any of the stored patterns in the system, then a new category is created with a new stored pattern that resembles the input pattern.

In the pattern database 34, one ART system can be used for each of the measured parameters 35. The combined outputs of the system will be used to determine and continuously refine a specific set of operating conditions for use by the Control Law Generator 38. These outputs will include predictions of available power, weather, load and demand for the succeeding 24-hour period.

With further reference to FIG. 2, the control law generator 38 can use a linear programming algorithm implemented in fuzzy logic variables to generate the control law used in directing the charge/discharge controller 16A. The Control Law Generator uses a fuzzy rule set to interpret the selected patterns from the Pattern Database 34 and uses these to select an appropriate set of linear constraint equations. An routine based on principles of linear programming or neural network-based nonlinear optimization determines the optimal operating parameters governing the behavior of the Charge/Discharge Controller. The optimization will attempt to maximize return on investment or minimize cost to the owner of a distributed generation resource while providing the necessary redundant power backup for the neighborhood it is controlling.. A performance indicating measurement will be continually monitored by a dynamic tuning system that perturbs the constraint equations to seek the true optimum operating condition.

In general, the objectives of the neighborhood controller 20 are to control power flow between the energy users 24A–24G and the external power grid, and to provide redundant backup energy storage to the household energy storage devices 22B–22H. The neighborhood controller 20 uses the neural network 41 to learn weather and neighborhood load demands. It uses this information to predict the quantity of energy it needs to store in the neighborhood. If the neighborhood controller 20 predicts a need for energy storage, it asks the household controller 40 associated with each distributed power generator 12 to sell it power. If it cannot get the power it needs from the neighborhood, it buys power from the grid.

Figure 3:
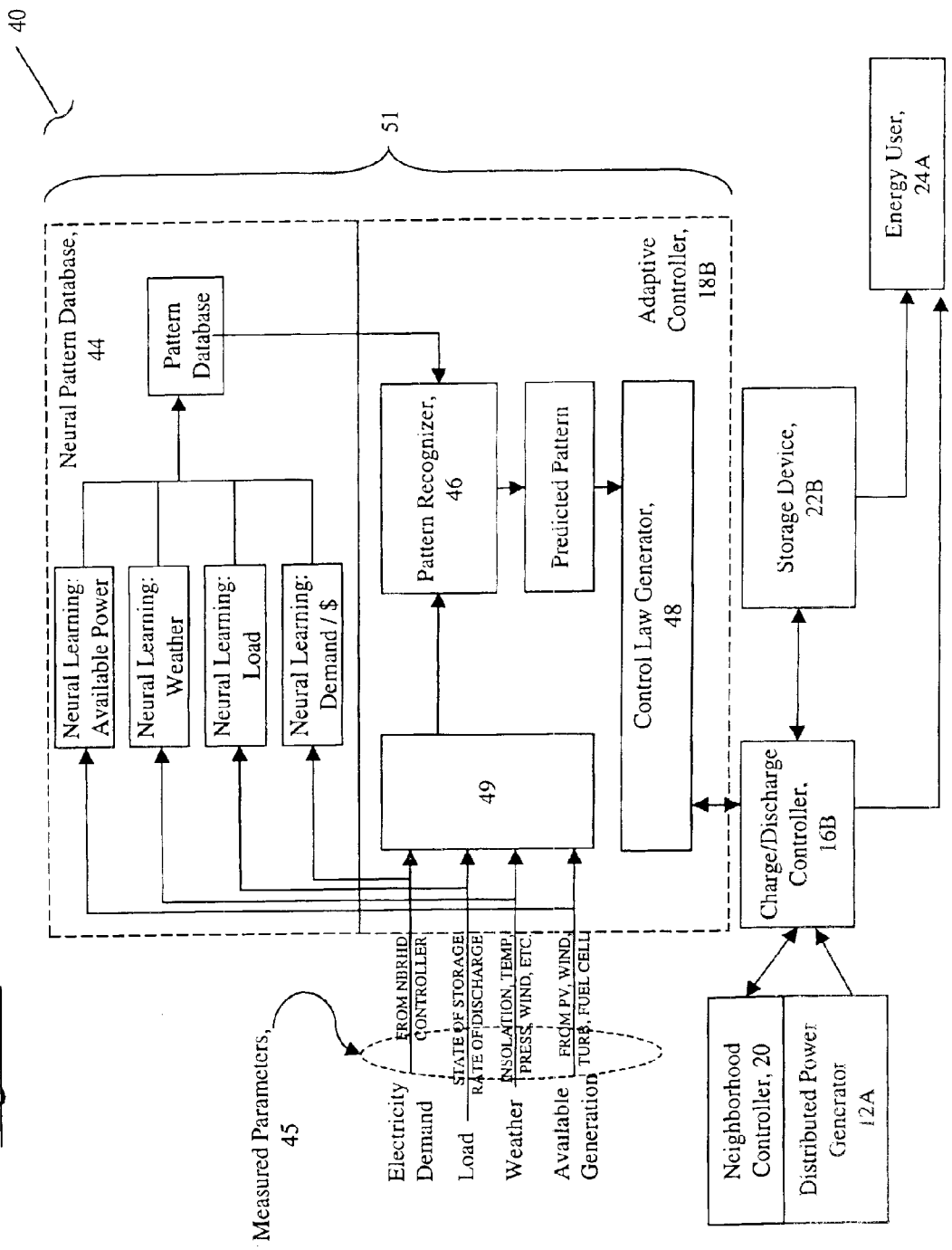
FIG. 3 is an exemplary block diagram of the household controller of FIG. 1.

FIG. 3 shows a detailed block diagram of an exemplary household controller 40 associated with the energy user 24A. The household controller 40 and the distributed energy generator 12A are preferable located proximal to the energy user 24A. The exemplary household controller 40 includes the adaptive controller 18B and the charge/discharge controller 16B. The adaptive controller 18B directs the charge/discharge controller 16B. The charge/discharge controller 16B transfers energy between the neighborhood controller 20, the distributed power generator 12A, and the storage devices 22B. The energy user 24 can obtain its needed power from the energy storage device 22B or from the charge/discharge controller 16B.

The adaptive controller 18B can include a pattern database 44, a pattern recognizer 46, a control law generator 48, and a measured parameter detector 49. The pattern database 44 stores and retrieves profiles for established parameters, such as: weather, load, demand and available power. The profiles in the pattern database can be based upon one or more past measured parameters from the measured parameter detector 49. The pattern recognizer 46 correlates the measured parameters 45 from detector 49 with a selected profile from the pattern database 44, and the control law generator 48 directs the charge/discharge controller 16B based upon the correlation between the measured parameters and the selected profile. The pattern database 44, the pattern recognizer 46 and the control law generator 48 together form a neural network 51.

The measured parameter detector 49 can measure the demand for electricity from the neighborhood controller 20. The parameter detector 49, in accordance with one feature of the invention, can obtain a signal from the neighborhood controller identifying the current demand for electricity. The parameter detector 49 can measure other parameters, such as the actual load demand from its associated energy user 24A; the state of energy storage and rate of discharge from the energy storage devices 22A; current weather (insolation, wind speed and direction, temperature and barometric pressure); and available power from distributed power generator 12A. The parameter detector 49 forwards these measurements to the neural network 51, preferably to the pattern recognizer 46.

Other aspects of the invention provide for a neural network 51 that serves as an evolving pattern database that can correlate the current measured parameters received from element 49 to established weather, load, demand and available power profiles obtained from the pattern database 44. The selected profile can be used to predict trends in all parameters, and therefore, becomes the basis for generating a control law.

The control law generator 48 can use a linear programming algorithm implemented in fuzzy logic variables to generate the control law used in directing the charge/discharge controller 16B. The Control Law Generator uses a fuzzy rule set to interpret the selected patterns from the Pattern Database 44 and uses these to select an appropriate set of linear constraint equations. These equations represent the following constraints: the need to meet predicted load of the energy user 24A, predicted generation capacity, cost of generation, and state of capacity of the energy storage device 22B. An routine based on principles of linear programming or neural-network based nonlinear optimization determines the operating parameters governing the behavior of the Charge/Discharge Controller 16B. The optimization will attempt to maximize return on investment or minimize cost to the owner of a distributed generation resource. A performance indicating measurement will be continually monitored by a dynamic tuning system that perturbs the constraint equations to seek the true optimum operating condition.

The household controller 40 can then use this information in a fuzzy process to decide how much generated power to store in 22B for use by energy user 24A and how much to send to the neighborhood controller 20 for sale to the grid 14, energy users 24A–24G, or to store locally in storage 22A.. Since the controller's household optimization parameter is cost, the household controller 40 continually monitors its input parameters to identify the optimum buying/seling profile for any given day. The actual buying and selling transactions are governed by the neighborhood controller 20. In general, the objective of the household controller 40 is to maximize the potential profit or minimize the cost to the energy user 24A depending on whether the energy user 24A is a net seller or purchaser of electricity. By predicting trends in weather and load, the control law can be programmed to take future demand and generation potential into account.

The apparatus 10 can thus provide for a plurality of household controllers associated with each energy user 24A–24G that interact with the grid 14 and one another through a single neighborhood controller 20. The household controllers maximize return on investment to the users 24A–24G by monitoring utility demand and other parameters 35 to predict future selling and buying opportunities. The neighborhood controller 20 enables bulk electricity transactions on the wholesale market and provides additional power reliability to the entire apparatus 10. This technology turns a community of distributed power generators 24A–24G into a single large generator capable of selling locally generated power in a coordinated manner similar to commercial power plants.

What is claimed is:

1. An apparatus operably coupled to an electrical power grid and including a distributed power generator, the apparatus comprising:
   a charge/discharge controller capable of transferring energy generated by the distributed power generator to the power grid and capable of transferring energy from the power grid to the apparatus, and
   an adaptive controller that directs, based upon a correlation between at least one selected parameter and a profile, whether the charge/discharge controller transfers energy generated by the distributed power generator to the electrical power grid or from the power grid to the apparatus.

2. The apparatus according to claim 1, further including a neighborhood c controller having the charge/discharge controller housed therein, wherein the neighborhood controller interfaces with the power grid.

3. The apparatus according to claim 2, wherein the neighborhood controller provides the combined energy generating capacity of the plurality of distributed power generators to the power grid.

4. The apparatus according to claim 2, wherein the neighborhood controller enables bulk energy transactions between the plurality of distributed power generators and the power grid.

5. The apparatus according to claim 4, wherein the neighborhood controller provides blocks of energy that enable transactions on the wholesale electricity market.

6. The apparatus according to claim 1, wherein the distributed power generator is located proximal to an energy user.

7. The apparatus according to claim 1, wherein the charge/discharge controller includes circuitry for transferring energy from the power grid to an energy user located proximal to the distributed power generator based upon the least one selected parameter.

8. The apparatus according to claim 1, wherein the charge/discharge controller includes circuitry for transferring energy from the distributed power generator to an energy user.

9. The apparatus according to claim 1, further including an energy storage device and wherein the charge/discharge controller includes circuitry for transferring energy generated by the distributed power generator to the energy storage device.

10. The apparatus according to claim 9, wherein the adaptive controller directs the charge/discharge controller to transfer energy to the storage device based upon the at least one selected parameter.

11. The apparatus according to claim 2, wherein the neighborhood controller includes an energy storage device.

12. The apparatus according to claim 1, wherein the charge/discharge controller includes circuitry for transferring energy between an energy storage device and the power grid.

13. The apparatus according to claim 1, wherein the charge/discharge controller includes circuitry for transferring energy from an energy storage device to an energy user.

14. The apparatus according to claim 1, wherein the adaptive controller directs the charge/discharge controller based upon a parameter selected from the group consisting of: energy price, energy load, current weather, and available energy.

15. The apparatus according to claim 1, wherein the adaptive controller includes a neural network for directing the charge/discharge controller to transfer energy to the electrical grid.

16. The apparatus according to claim 15 wherein the neural network includes a pattern database for storage and retrieval of profiles based upon measured parameters.

17. The apparatus according to claim 16 wherein the stored parameters are selected from the group consisting of: energy load, current weather, available energy, and energy price.

18. The apparatus according to claim 16 wherein the neural network includes a pattern recognizer for correlating a current measured parameter with a selected profile from the pattern database.

19. The apparatus according to claim 18 wherein the neural network includes a control law generator for directing the charge/discharge controller based upon the correlation between the current measured parameter and the selected profile.

20. The apparatus according to claim 15, wherein the neural network includes a processor executing a set of instructions that instruct the charge/discharge controller to transfer energy to the power grid based upon a price of electricity on the grid and based upon a cost of generating electricity at the distributed power generator.

21. An apparatus operably coupled to an electrical power grid and including a distributed power generator, the apparatus comprising:
a charge/discharge controller capable of transferring energy
generated by the distributed power generator to the power grid and capable of
transferring energy from the power grid to the apparatus, and
an adaptive controller, including a neural network, that directs, the charge/discharge
controller to transfer energy generated by the distributed power generator to the
power grid or to transfer energy from the power grid to the apparatus.

22. The apparatus according to claim 21, further including an energy storage device and wherein the charge/discharge controller transfers to and retrieves energy from the energy storage device.

23. The apparatus according to claim 22, wherein the adaptive controller directs the charge/discharge controller to transfer energy to the storage device based upon the at least one selected parameter.

24. The apparatus according to claim 21, wherein the adaptive controller directs the charge/discharge controller based upon a parameter selected from the list consisting of: energy price, energy load, current weather, and available energy.

25. The apparatus according to claim 21, wherein the neural network includes a pattern database for storage an retrieval of profiles based upon measured parameters.

26. The apparatus according to claim 25, wherein the stored parameters are selected from the group consisting of: energy load, current weather, available energy, and energy price.

27. The apparatus according to claim 25, wherein the neural network includes a pattern recognizer for correlating a current measured parameter with a selected profile from the pattern database.

28. The apparatus according to claim 27, wherein the neural network includes a control law generator for directing the charge/discharge controller based upon the correlation between the current measured parameter and the selected profile.

29. The apparatus according to claim 21, wherein the neural network includes a processor executing a set of instructions that instruct the charge/discharge controller to transfer energy to the power grid based upon a price of electricity on the grid and based upon a cost of generating electricity at the distributed power generator.

30. A method for coupling an apparatus including a distributed power genrator to an electrical power grid, comprising:
determining, based upon a correlation between at least one selected parameter and a profile, whether to transfer energy from the distributed power generator to the electrical grid or to transfer energy from the electrical grid to the apparatus, and
selectively transferring energy from the distributed power generator to the electrical grid or form the electrical grid to the apparatus through a charge/discharge controller in response to the determining step.

31. The method according to claim 30, further comprising the step of determining, based upon at least one elected parameter, whether to transfer energy from the electrical grid to an energy storage device through the charge/discharge controller.

32. The method according to claim 30, further comprising the step of determining, based upon at least one selected parameter, whether to transfer energy from the electrical grid to an energy user through the charge/discharge controller.

33. The method according to claim 30, further comprising the step of determining, based upon at least one selected parameter, whether to transfer energy from the distributed power generator to an energy storage device through the charge/discharge controller.

34. The method according to claim 30, further comprising the step of determining, based upon at least one selected parameter, whether to transfer energy from the distributed power generator to an energy user through the charge/discharge controller.

35. The method according to claim 30, further comprising the step of determining, based upon at least one selected parameter, whether to transfer energy from an energy storage device to an energy user through the charge/discharge controller.

36. The method according to claim 30, further comprising the step of measuring the current value of the at least one selected parameter.

37. The method according to claim 36, further including the step of correlating the measured parameter the profile.

38. The method according to claim 37, wherein the step of correlating the measured parameter with the profile further includes the step of optimizing the operation of the charge/discharge controller using nonlinear algorithms.

39. The method according to claim 37, wherein the profile is stored in a pattern database.

40. The method according to claim 37, wherein the adaptive controller directs the charge/discharge controller based upon the correlation between the measured parameter and the profile.

41. The method according to claim 30, wherein the charge/discharge controller is housed within a neighborhood controller that interfaces with the power grid.

42. The method according to claim 41, wherein the neighborhood controller provides the combined energy generating capacity of the plurality of distributed power generators to the power grid.

43. The method according to claim 30, wherein the at least one selected parameter is selected from the group consisting of: energy price, energy load, current weather, and available energy.

* * * * *